United States Patent [19]

Arai

[11] 4,273,656
[45] Jun. 16, 1981

[54] FILTER FOR FLUID PASSAGE

[75] Inventor: Hisaharu Arai, Nagoya, Japan

[73] Assignee: Aisan Industry Co., Ltd., Aichi, Japan

[21] Appl. No.: 33,663

[22] Filed: Apr. 26, 1979

[30] Foreign Application Priority Data

May 9, 1978 [JP] Japan .................................. 53-54601

[51] Int. Cl.³ ............................................. B01D 27/00
[52] U.S. Cl. ...................................... 210/448; 210/452
[58] Field of Search ........................ 210/232, 448, 452; 285/397

[56] References Cited

U.S. PATENT DOCUMENTS

| | | | |
|---|---|---|---|
| 2,053,336 | 9/1936 | Jacobson | 285/397 |
| 3,749,250 | 7/1963 | Oldford | 210/452 X |
| 3,817,389 | 6/1974 | Weichelsbaum | 210/448 |
| 3,931,015 | 1/1976 | Jenkins | 210/232 |
| 3,951,798 | 4/1976 | Haldopoulos | 210/452 |

Primary Examiner—Peter A. Hruskoci

[57] ABSTRACT

A filter adapted for use in a fluid passage and having a novel structure for coupling to the fluid passage. The filter has a general configuration of a bottom-ended cylinder, with the bottom portion formed with a plurality of bores constituting a filtrating screen. The cylinder has an annular joining projection at an end remote from the filtrating screeen, the projection being securely elastically fitted on the outer circumferential surface of a restriction fixed to the fluid passage or on the inner surface of the fluid passage, securely and airtightly coupled to each other. The filter is positioned close to the constriction of the fluid passage, the risk of accumulation of alien matter therebetween being eliminated. Also, the entire cylindrical filter is made from an integral molding of elastic material, there being no likelihood of adverse effect by the fibers that constitute the filter.

7 Claims, 4 Drawing Figures

FILTER FOR FLUID PASSAGE

BACKGROUND OF THE INVENTION

In a flow control system provided with a constriction in the fluid passage, a filter is usually disposed at a position slightly upstream of the constriction so as to inhibit foreign matter from entering the constriction. The foreign matter that might cause clogging of the constriction includes the corrupt substance produced from corrosion of the pipes forming the fluid passage or from degeneration of the fluid itself, and in certain extreme cases, such clogging may be caused by the frayed pieces of fibers constituting the filter. Where the fluid passage is less than 1 mm in diameter, a space tends to be created when a filter is mounted in the fluid passage and the foreign matter might pass through such space to enter the constriction and clog it. This is because the size of the filter itself must be reduced correspondingly to the diameter of the fluid passage and there was available so suitable means for allowing secure airtight coupling of the filter and the fluid passage.

SUMMARY OF THE INVENTION

This invention has an object to provide a novel joining structure for obtaining a secure and airtight coupling of the filter and the fluid passage, which joining structure can be worked with ease and at low cost. More specifically, this invention provides a filter adapted for use in a fluid passage, the filter having a general configuration of a bottom-ended cylinder, the porous bottom wall thereof constituting a filtrating screen, and the entirety of the cylindrical filter is made from integral molding. The cylinder has an annular coupling bulge at an end remote from the filtrating screen in the flowing direction of the fluid, such annular bulge being tightly fitted in the corresponding recesses formed in the fluid passage.

DESCRIPTION OF THE PREFERRED EMBODIMENTS

Figure 1:
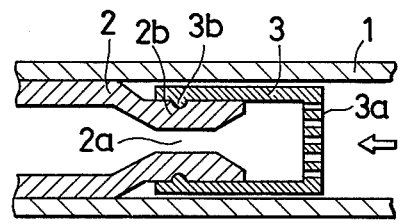
FIGS. 1 to 4 are cross-sectional views of different embodiments of this invention wherein similar numerals represent similar elements.

Referring to FIG. 1, a pipe 1 a forms a fluid passage and a restriction member 2 is provided in the pipe 1 having a constricting portion 2' and a central opening 2a serving as a constriction. A filter 3 is formed as a cylindrical body with a bottom end of which the porous bottom constitutes a filtrating screen 3a and has one open end portion 4 having a terminal end 4a of the filter body 3. The fluid flows in the pipe 1 leftwise in the drawing as shown by an arrow. Toward the left end (the end remote from the filtrating screen) of the cylindrical portion of the filter 3 there is provided a small-sized annular projection 3b having one end 3b' remote from the terminal end 4a of the filter body 3 as a coupling means. This annular projection 3b is elastically fitted into the corresponding annular recess 2b formed in the constricting member 2, whereby said both elements are airtightly joined together. The filter 3 is produced in its entirety by injection molding from an elastic synthetic rasin material such as for example polyacetal resin. The apertures in the filter screen 3a are smaller in area than the constriction 2a. Such apertures are provided in large number, and the total area thereof is greater than the area of the constriction 2a so that the flow rate through such apertures will be several times as high as that through the constriction 2a. The projection 3b is formed on the inner circumferential surface of the cylindrical portion of the filter 3 and fits into the corresponding recess formed in the outer peripheral surface of the constricting member 2 so that the positions of these both elements in the flowing direction of the fluid are determined. The joining (fitting) of the projection 3b and recess 2b can be effected by slightly spreading out the elastic cylindrical portion of the filter 3 and pushing it until the projection 3b fits into the recess 2b. Once they snugly fit each other, there remains only a trace of or no elasticity, and hence there is no risk of crazing due to creep of the material constituting the filter.

Figure 2:
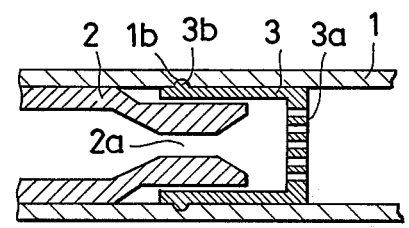

FIG. 2 shows an embodiment in which the annular bulge or projection 3b is provided on the outer circumferential surface of the cylindrical portion of the filter 3 and fits into the mating recess 1b formed in the inner peripheral surface of the pipe 1.

Figure 3:
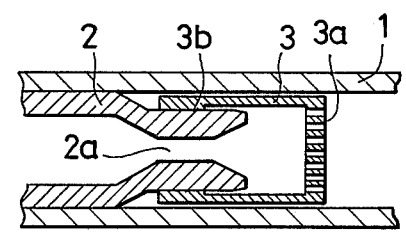
Figure 4:
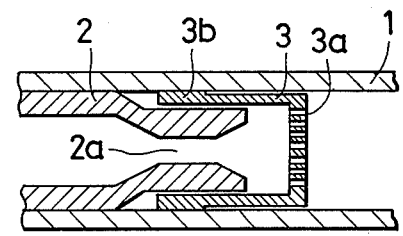

FIGS. 3 and 4 show the modifications of the embodiments of FIGS. 1 and 2, in which the projection 3b on the filter 3 is pressed into position on the peripheral portion of the constricting member 2 or on an inner peripheral portion of the pipe 1 by making use of the elasticity of the filter material without the necessity for a recess on the other engaging part.

In the embodiments of FIGS. 2 and 4, first the filter 3 is set in position in the pipe 1 and then the constricting member 2 is mounted. In applications where particularly high precession is required of the filter 3, the latter may be made from a sintered alloy composed of the fine particles with a given range of diameter.

Thus, one of this invention allows secure maintenance of airtightness between the filter and the fluid passage, and since the filter can be located close to the constriction, there is eliminated any risk of accumulation of foreign matter therebetween. Further, because the filter is made by integral molding in its entirety, there is no likelihood of harmful effect of the fibers from which the filter is constituted. It may be noted that the projections 3b radially engage against the cooperating peripheral surface of pipe 1 or of constricting portion 2', and preferably the circumferential surface of the end portion 4 of the filter body 3 that extends entirely from the terminal end 4a up to at least the end 3b' of the projection 3b also radially engages against the cooperating peripheral surface while the other circumferential surface of the filter body 3 is annularly spaced from the other peripheral surface (of the constricting portion 2' or of the pipe 1).

What is claimed is:

1. A filter for use in a fluid passage, comprising
   a solid non-porous non-deformable cylindrical filter body having a bottom wall and one open end portion having a terminal end of said filter body remote from said bottom wall, said bottom wall constituting a filter screen formed with a plurality of bores,
   said filter body having an annular projection formed on said open end portion on one circumferential surface thereof,
   said filter body constituting an integral one-piece unit made of elastic material, said filter body having elasticity at said one open end portion, a restriction member disposed in said fluid passage and having a narrowed constricting portion defining an outer peripheral surface spaced from an inner surface of the fluid passage, said restriction member defining a central opening therethrough, said cylindrical filter body at said open end portion being fitted around said constricting portion of said restriction member covering said constricting portion and with said filter screen disposed adjacent said central opening of said constricting portion, said outer peripheral surface of said constricting portion and the inner surface of the fluid passage constituting peripheral surfaces, said annular projection on said open end portion of said filter body being elastically radially press-fitted onto one of said peripheral surfaces constituting elastic connecting element means for connecting said cylindrical filter body fluid-tightly to said one of said peripheral surfaces, said other of said peripheral surfaces being annularly spaced from said cylindrical filter body.

2. The filter as set forth in claim 1, wherein each of the bores in the filter screen has an area much smaller than the cross-sectional area of the narrowed constricting portion, and the sum of the area of each of the bores is greater than the cross-sectional area of the narrowed constricting portion.

3. The filter as set forth in claim 1, wherein the elastic material is synthetic resin.

4. The filter as set forth in claim 1, wherein an annular thickness of said one open end portion of the cylindrical filter body is smaller than the spacing between said inner surface of said fluid passage and the outer peripheral surface of the constricting portion.

5. The filter as set forth in claim 1, wherein said one peripheral surface and said open end portion constitute sealing surfaces, one of said sealing surfaces is formed with an annular projection and the other of said sealing surfaces is formed with a complementary recess in which said projection engages.

6. The filter as set forth in claim 1, wherein said one peripheral surface and said open end portion constitute sealing surfaces, one of said sealing surfaces is formed with an axially elongated projection engaging against the other of said sealing surfaces.

7. The filter as set forth in claim 1, wherein said projection has one end remote from said terminal end of said filter body, said circumferential surface of said open end portion extending entirely from said terminal end of said filter body up to at least said one end of said annular projection radially pressingly engages said one of said peripheral surfaces.

* * * * *